(12) United States Patent
Sugiyama et al.

(10) Patent No.: US 6,169,836 B1
(45) Date of Patent: Jan. 2, 2001

(54) OPTICAL TRANSMISSION TUBE AND METHOD FOR MAKING THE SAME

(75) Inventors: Hideo Sugiyama, Higashimurayama; Minoru Ishiharada, Urawa; Tatsuo Terahama, Tokyo; Yasuhiro Morimura, Kodaira; Itsuo Tanuma, Sayama, all of (JP)

(73) Assignee: Bridgestone Corporation, Tokyo (JP)

( * ) Notice: Under 35 U.S.C. 154(b), the term of this patent shall be extended for 0 days.

(21) Appl. No.: 09/314,081

(22) Filed: May 19, 1999

(30) Foreign Application Priority Data

May 20, 1998 (JP) .................................................. 10-138240

(51) Int. Cl.$^7$ ...................................................... G02B 6/02
(52) U.S. Cl. .......................... 385/123; 385/901; 362/552; 362/560
(58) Field of Search .......................... 385/123, 126–128, 385/147; 362/552, 560; 252/182.11, 182.32–182.35, 183.11–183.16

(56) References Cited

U.S. PATENT DOCUMENTS 5,542,017 * 7/1996 Koike ........................................ 385/123
5,982,969 * 11/1999 Sugiyama et al. ....................... 385/123

* cited by examiner

*Primary Examiner*—John D. Lee
*Assistant Examiner*—Michelle R. Connelly-Cushwa
(74) *Attorney, Agent, or Firm*—Sughrue, Mion, Zinn, Macpeak & Seas, PLLC

(57) ABSTRACT

A method of making an optical transmission tube comprises having a tubular clad and a core covered with the tube and having a refractive index higher than the clad. The core has light-scattering particles uniformly dispersed in or throughout the core, so that light passing through the core is reflected and scattered at individual scattering particles to permit the light to be emitted from outer surfaces of the clad.

7 Claims, 2 Drawing Sheets

OPTICAL TRANSMISSION TUBE AND METHOD FOR MAKING THE SAME

BACKGROUND OF THE INVENTION

This invention relates to an optical transmission tube including an optically transparent tubular clad, and an optically transparent core having a reflective index higher than the clad, and a method for making the same. More particularly, the invention relates to an optical transmission tube wherein light emission from outer surfaces of the clad is enhanced, and a method for making such a tube.

As is known in the art, with an optical transmission tube, which is constituted of a tubular clad and a core having a refractive index higher than the core, luminance at side faces is not generally high. This is because such an optical transmission tube sends light to the tip thereof in a quantity as much as possible. In order to increase luminance, there is used a method wherein a clad is made irregular at inner surfaces thereof so that the luminance at the side faces of an optical transmission tube is raised. However, where an optical transmission tube is made by filling a polymerizable liquid monomer used to form a core in a tubular clad and polymerizing the monomer under pressure, such an irregular clad is liable to break, thus making it difficult to carry out the above method.

SUMMARY OF THE INVENTION

It is accordingly an object of the invention to provide an optical transmission tube which ensures emission of light at high luminance from the outer surfaces of the transmission tube.

It is another object of the invention to provide an optical transmission tube wherein light can be emitted from the entire outer surfaces of the tube.

It is a further object of the invention to provide a method for making an optical transmission tube of the type mentioned above in a simple way.

It is a still further object of the invention to provide a method for easily making an optical transmission tube with its length being from as short as 1 to 2 m to as 10 long as 5 to 10 m.

The above objects can be achieved, according to one embodiment of the invention, by an optical transmission tube which comprises a tubular clad and a core covered with the tubular clad and having a refractive index higher than the tubular clad, wherein the core contains light-scattering particles uniformly dispersed throughout the core whereby light passing through the core is reflected and scattered at individual light-scattering particles and is allowed to be emitted from outer surfaces of the clad.

In the practice of the invention, it is preferred that the particles have an average size of 0.1 to 30 $\mu$m. It is also preferred that the tube further comprises a reflective protection layer formed at part a of the outer surfaces of the clad. Moreover, the tubular clad is preferably made of a fluoropolymer, and the core is made of an acrylic polymer.

According to another embodiment of the invention, there is also provided a method for making an optical transmission tube of the type which comprises a tubular clad and a core covered with the tubular clad and having a refractive index higher than the tubular clad, the method comprising dispersing light-scattering particles in a solution containing a monomer capable of forming a core through its polymerization, charging the solution into a tubular clad, polymerizing the monomer in the solution while vibrating and/or rotating the tubular clad to permit the light-scattering particles to be uniformly dispersed throughout the solution whereby the resultant solid polymer core has the light-scattering particles uniformly dispersed in or throughout the core.

The optical transmission tube of the invention is formed by uniformly dispersing light-scattering particles throughout the core, so that intense light passing through the inside of the core in the greatest quantity thereof is scattered by means of the particles, and thus, intense light is released or emitted from all azimuthal directions of the outer surfaces of the clad. Thus, very high luminance is obtained and very high brightness results. When the light-scattering particles are formed, for example, of silicone resins, polystyrene resin, metal oxides or the like, very high light emission is attained. Moreover, when a metallic sheet or a reflective coating wherein light-scattering particles are dispersed is formed, as a reflective protection film, in a pattern on the outer surfaces of the clad, the tube can be imparted with directivity in light emission according to the pattern.

When using a method for making such an optical transmission tube as mentioned above according to the invention, there can be very simply and accurately formed a core wherein light-scattering particles are uniformly dispersed. Thus, an optical transmission tube, which is very high in luminance, can be readily fabricated in long size. It may occur to one that when a core is formed, scattering particles are dispersed in an organic solvent of a polymer used to form a core, and the resultant dispersion is charged, for example, into an FEP (tetrafluoroethylene-hexafluoropropylene copolymer) tube, followed by removing the organic solvent under reduced pressure to form a core. However, this procedure is disadvantageous in that a limitation is placed on the length of the core along which the solvent is efficiently evaporated. It is difficult to make a long-size tube because of the poor manufacturing efficiency.

DETAILED DESCRIPTION OF THE INVENTION

Figure 1:
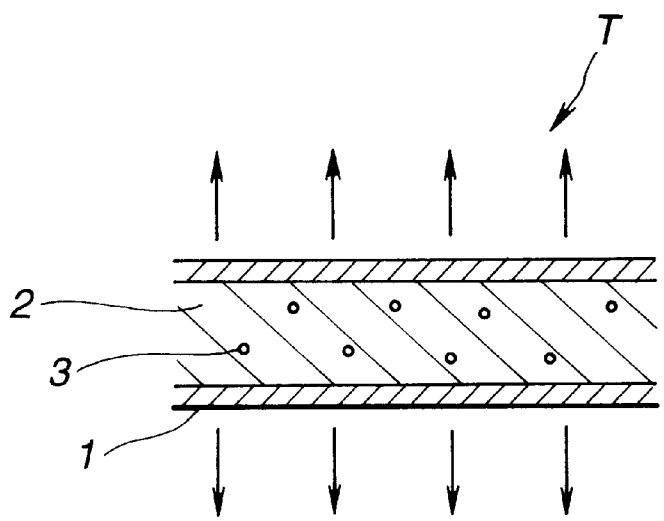
FIG. 1 is a schematic sectional side view showing an optical transmission tube according to one embodiment of the invention.
Figure 2:
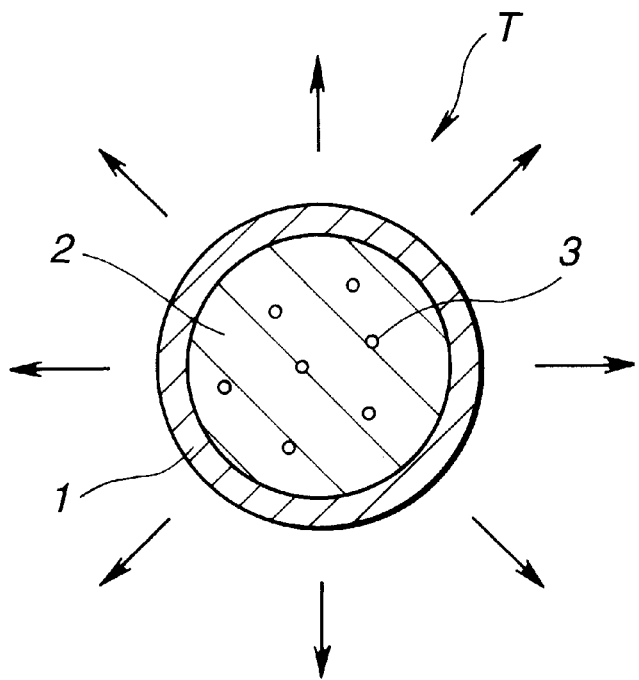
FIG. 2 is a schematic longitudinal section of the tube of FIG. 1.
Figure 3:
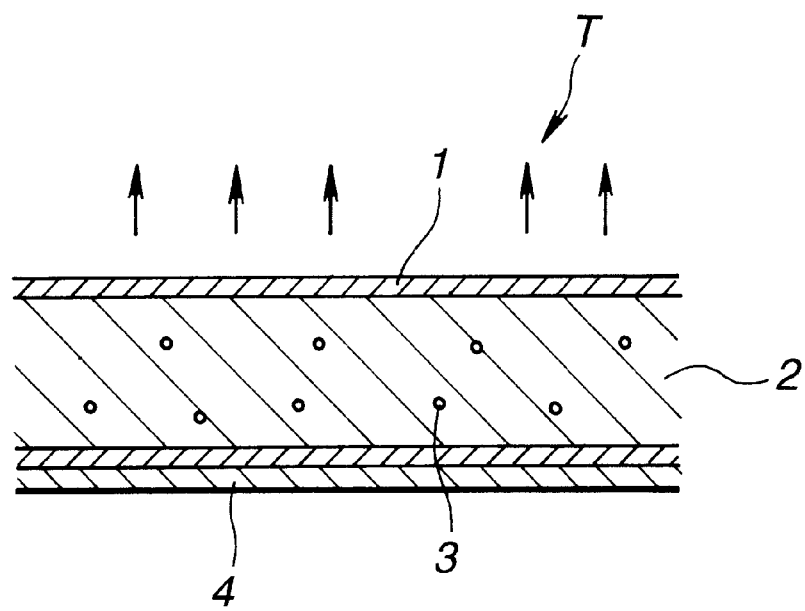
FIG. 3 is a schematic sectional side view showing an optical transmission tube according to another embodiment of the invention.
Figure 4:
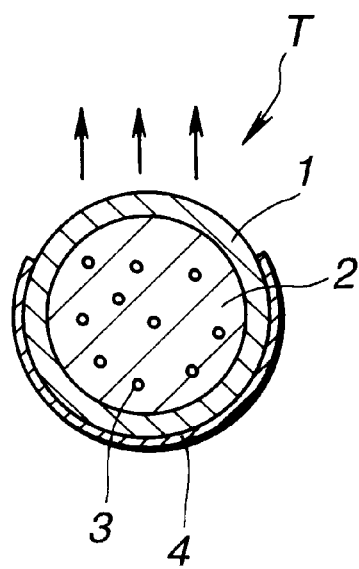
FIG. 4 is a schematic longitudinal section of the tube of FIG. 3.

Reference is now made to the accompanying drawings and particularly, to FIGS. 1 and 2. In the figures, an optical transmission tube T includes an optically transparent, tubular clad 1 and an optically transparent core 2 having a refractive index higher than the clad 1. The core 2 has light-scattering particles 3 uniformly dispersed in or throughout the core. In this arrangement, light L passing through the core 2 is scattered and reflected at the particles 3, thereby causing the light to be emitted from the whole outer surfaces of the optical transmission tube. If the clad 1 is covered with a reflective protection layer 4 at part of the outer surfaces thereof in a pattern as is particularly shown in FIGS. 3 and 4 wherein like reference numerals, respectively, indicate like parts or members as in FIGS. 1 and 2, light is not emitted from portions covered with the protection layer 4. Thus, light can be emitted in an intended direction, and thus the tube has directivity with respect to light emission.

The tubular clad should preferably be made of plastic or elastomer materials which have flexibility, are moldable into a tube, and have a low refractive index. Specific examples include polyethylene, polypropylene, polyamide, polystyrene, ABS resin, poly(methyl methacrylate), polycarbonate, poly(vinyl chloride), poly(vinylidene chloride), poly(vinyl acetate), ethylene-(vinyl acetate) copolymer, poly(vinyl alcohol), ethylene-(vinyl alcohol) copolymer, fluorocarbon polymer, silicone resin, natural rubber, polyisoprene rubber, polybutadiene rubber, styrene-butadiene copolymer, butyl rubber, halogenated butyl rubber, chloroprene rubber, acrylic rubber, EPDM (ethylene-propylene-diene terpolymer), acrylonitrile-butadiene copolymer, fluorocarbon rubber, silicone rubber and the like.

Of these, silicone polymers and fluoropolymers or rubbers having a lower refractive index are preferred. Specific examples include silicone polymers such as dimethylsiloxane polymer, methylphenylsiloxane polymer, fluorosilicone polymer and the like, and fluoropolymers or rubbers such as polytetrafluoroethylene (PTFE), tetrafluoroethylene-hexafluoropropylene copolymer (FEP), tetrafluoroethylene-perfluoroalkoxyethylene copolymer (PFE), polychlorotrifluoroethylene (PCTFE), tetrafluoroethylene-ethylene copolymer (ETFE), poly(vinylidene fluoride), poly(vinyl fluoride), vinylidene fluoride-trifluorochloroethylene copolymer, vinylidene fluoride-hexafluoropropylene copolymer, vinylidene fluoride-hexafluoropropylene-tetrafluoroethylene terpolymer, tetrafluoroethylene propylene rubber, fluorine-containing thermoplastic elastomers, and the like. Of these, the fluoropolymers or rubbers are preferred. These materials may be used singly or in combination of two or more.

On the other hand, the core material should preferably be made of solid polymers including, for example, methacrylate polymer, polycarbonates, ethylidene norbornene polymer, styrene-ethylene-butadiene-styrene block polymer (SEBS) and the like. Of these, methacrylic polymers are preferred.

Examples of the methacrylic polymers include a homopolymer of one monomer selected from acrylic acid, methacrylic acid and esters thereof with monohydric alcohols, and copolymers of two or more monomers mentioned above. The monohydric alcohols are those which have from 1 to 22 carbon atoms. Of these, it is preferred to use such a copolymer of a monomer selected from acrylic acid, methacrylic acid and their ester with a lower alcohol having from 1 to 5 carbon atoms, preferably from 1 to 3 carbon atoms and most preferably one carbon atom, and a monomer of the following general formula (1) because of it good pliability and flexibility along with good optical transmission.

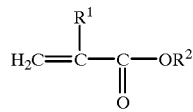

(1)

wherein $R^1$ represents a hydrogen atom or a methyl group, and $R^2$ represents an alkyl group having from 8 to 20 carbon atoms, preferably from 10 to 16 carbon atoms and more preferably 12 to 14 carbon atoms. The higher alkyl group represented by $R^2$ may be a single alkyl group or a mixture of alkyl groups. Most preferably, mixed alkyl groups having 12 and 13 carbon atoms are used. In this case, the ratio by weight between the alkyl group having 12 carbon atoms and the alkyl group having 13 carbon atoms is generally in the range of 20:80 to 80:20, preferably 40:60 to 60:40. For copolymerization, the ratio by weight between the monomer selected from acrylic acid, methacrylic acid and lower alcohol esters thereof and the monomer of the formula (1) may be appropriately selected, and is generally in the range of 5:95 to 79:21, preferably 30:70 to 65:35.

The core is not critical with respect to its diameter, and is usually in the range of 2 to 30 mm, preferably 5 to 15 mm.

The scattering particles dispersed in the core include, for example, organic polymer particles such as silicone resin particles, polystyrene resin particles, particles of metal oxides such as $Al_2O_3$, $TiO_2$, $SiO_2$, particles of sulfates such as $BaSO_4$, and particles of carbonates such as $CaCO_3$. These may be used singly or in combination of two or more.

The average size of the scattering particles is generally in the range of 0.1 to 30 μm, preferably from 1 to 15 μm. If the particle size exceeds 30 μm, a solution for the core is liable to inconveniently settle on the way of charging it into a clad tube when the optical transmission tube is made according to a method described hereinafter, coupled with another problem that a light scattering characteristic may lower. On the other hand, when the average particle size is smaller than 0.1 μm, wavelength dependence becomes very strong in the scattering of light, under which light with a shorter wavelength (blue) is more liable to be scattered and light with a longer wavelength (red) is more unlikely to be scattered. Hence, where white light is passed through the core, a considerable degree of yellowing unfavorably takes place in the vicinity of the tube end.

The amount of scattering particles is in the range of 0.1 to 200 ppm, preferably from 5 to 80 ppm, relative to a monomer used to form the core. If the amount of the particles is less than 0.1 ppm, light to be scattered becomes small in quantity, resulting in the lowering of luminance. When the amount exceeds 200 ppm, the particles are apt to settle down in a core-forming solution, thus sometimes leading to the disadvantage that luminance lowers owing to the failure in dispersion.

The reflective protection layer may be provided so that light, which is emitted from the entire outer periphery of an optical transmission tube, should have directivity. In this case, the protection layer may be one which is incapable of transmitting, to outside, light passing through the inside of the tube. If a protection layer which does not absorb light, but reflect it, it used radiated light has a more increased luminance. Specific examples of such a layer include foils or sheets of metals such as silver, aluminum, or films of coating compositions dispersing such scattering particles as mentioned above. The reflective protection layer may be in the form of a band, spiral or other desired shape, depending on the purpose in end use of the optical transmission tube.

The optical transmission tube of the invention wherein scattering particles are uniformly dispersed in or throughout a core is obtained by charging, into a clad tube, a core-forming solution dispersing scattering particles in a monomer for core, rotating and/or vibrating the clad tube sealed at opposite ends thereof, and subjecting the solution to polymerization and solidification under conditions where the particles are uniformly dispersed in the solution.

The tube may be rotated about or at the intermediate portion thereof, as viewed along its length, in one direction or while reversing the direction of the rotation at intervals, or may be vibrated or swung about or at the intermediate portion. In either case, scattering particles should be uniformly dispersed in the solution. The polymerization may be conducted after stopping rotation or vibrations, or during the course of the rotation or vibrations.

The manner of polymerization of a monomer is not critical. In general, there may be used a method wherein a polymerization initiator including, for example, an organic peroxide such as t-butyl hydroperoxide, di-t-butyl peroxide, lauroyl peroxide, benzoyl peroxide, dimyristyl peroxydicarbonate, t-butyl peroxyacetate, t-butyl peroxy(2-ethylhexanoate), cumyl peroxyoctoate, or an azo compound such as azobisisobutyronitrile, azobiscyclohexanenitrile, is added in an effective amount to a polymerization system, followed by polymerization at 50 to 120° C. for 1 to 20 hours. It is preferred that the polymerization is performed while pressurizing the core-forming solution from one or both ends of the clad tube. In doing so, bubbles or the like defects are not caused to be formed in the resultant core.

EXAMPLE

The invention is more particularly described by way of examples, which should not be construed as limiting the invention thereto. Comparative Examples are also described.

Example 1

0.01 part of silicone resin particles (Toshiba Silicone Co., Ltd.) having different average sizes of 0.5 $\mu$m and 2 $\mu$m was added, as scattering particles, to and uniformly dispersed in a monomer solution consisting of 60 parts by weight of methyl methacrylate (MMA), 40 parts by weight of lauryl methacrylate (LMA), and 0.05 part by weight of benzoyl peroxide (BPO). The resultant dispersion was charged into a transparent FEP tube having an outer diameter of 6 mm and a length of 1.5 m, and. the tube was sealed at opposite ends thereof. The dispersion was polymerized and solidified by heating on a hot bath at 65° C. for 3 hours under a pressure of 3 kg/cm$^2$ applied to from opposite ends while vibrating (over about 30 minutes).

In this way, two optical transmission tubes were obtained, in which the particles were found to be uniformly dispersed in the core.

For comparison, the above procedure was repeated without use of scattering particles.

Light from a halogen lamp (20 W) was passed from one to another end of each tube to measure a luminance at an outer surface of the tube at three points of 15, 50 and 85 cm from one end of the tube at which a light source was located. The results are shown in Table 1. Moreover, the results of chromaticity (i.e. chromaticity of the XYZ calorimetric system) of the tubes of the invention are shown in Table 2. These results were obtained by measurement through a luminance meter (colorimetric chromoscope CS-100 of Minolta Co., Ltd.).

TABLE 1

| Silicone resin particles | Distance from one end of tube (luminance (d/cm$^2$)) | | | |
|---|---|---|---|---|
| (average size) | 15 cm | 50 cm | 85 cm | |
| No scattering particles | 30.5 | 14.5 | 13.5 | Comparative Example |
| 0.5 $\mu$m | 750 | 167 | 54.3 | Example |
| 2 $\mu$m | 588 | 231 | 76.8 | |

TABLE 2

| Silicone resin particles | Distance from one end of tube (chromaticity) | | | |
|---|---|---|---|---|
| (average size) | 15 cm | 50 cm | 85 cm | |
| 0.5 $\mu$m | x 0.392 y 0.436 | x 0.424 y 0.451 | x 0.454 y 0.458 | Example |
| 2 $\mu$m | x 0.391 y 0.435 | x 0.417 y 0.446 | x 0.433 y 0.450 | |

Example 2

0.001 part by weight of silicone resin scattering particles having an average size of 2 $\mu$m was uniformly dispersed in such a monomer solution as used in Example 1, and the dispersion was charged into an FEP tube having an outer diameter of 13 mm and a length of 8 m, followed by polymerization and solidification under vibrations (for about 30 minutes).

Light of a metal halide lamp (150 W) was passed from one end of the resultant optical transmission tube, followed by measurement of a luminance at distances of 1.5, 3 and 5 m from the end of the tube, at which a light source was located, in the same manner as in Example 1. The results are shown in Table 3.

TABLE 3

| Silicone resin particles | Distance from one end of tube (luminance (d/cm$^2$)) | | | |
|---|---|---|---|---|
| (average size) | 1.5 m | 3 m | 5 m | |
| No scattering particles | 240 | 220 | 200 | Comparative Example |
| 2 $\mu$m | 980 | 800 | 600 | Example |

The results of Example 1 reveal that the luminance from the outer surfaces of the tubes are remarkably improved. It has been also found from the measurement of the luminance that a larger size of the particles results in a smaller difference between the maximum and minimum values of luminance depending on the measuring position, thus a luminance distribution being lessened. On the other hand, the results of measurement of the chromaticity reveal that a larger size of the scattering particles results in a smaller variation in the values of the XYZ calorimetric system, and thus, a color change (yellowing) is further reduced. From Example 2, it will be seen that the large-sized tube (with an outer diameter of 13 mm) and the long tube (having a length of 5 m) are much greater in luminance than the tube for comparison.

What is claimed is:
1. A method for making an optical transmission tube of the type which comprises a tubular clad and a core covered with said tubular clad and having a refractive index higher than said tubular clad, said method comprising the steps of: dispersing light-scattering particles in a solution containing a monomer capable of forming a core through its polymerization, said light-scattering particles being present in the solution in an amount in the range of 5 to 80 ppm relative to said monomer, charging said solution into a tubular clad, polymerizing said monomer in said solution under conditions which permit said light-scattering particles to be uniformly dispersed throughout said solution, whereby the resultant solid polymer core has said light-scattering particles uniformly dispersed in or throughout said core.

2. A method according to claim 1, wherein said light-scattering particles have an average size of 0.1 to 30 $\mu$m.

3. A method according to claim 1, further comprising the step of forming a reflective protection layer at part of the outer surfaces of said core so that the light emitting from the outer surfaces of the clad has directivity.

4. A method according to claim 1 wherein said tublar clad is made of a fluoropolymer and said core is made of an acrylic polymer.

5. A method according to claim 4, wherein said acrylic polymer consists of a polymerization product of a monomer selected from the group consisting of acrylic acid, methacrylic acid, and esters thereof with a monohydric alcohol.

6. A method according to claim 1, wherein the step of polymerization is performed while vibrating the tubular clad.

7. A method according to claim 1, wherein the step of polymerization is performed while rotating the tubular clad.

* * * * *